Nov. 25, 1969  N. A. CRITES  3,480,003
APPARATUS FOR MEASURING ESOPHAGEAL MOTILITY
Filed Feb. 3, 1967  3 Sheets-Sheet 3
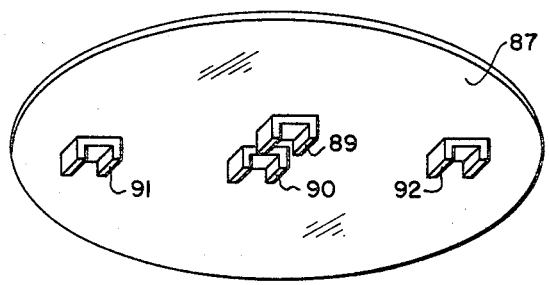
Fig. 4
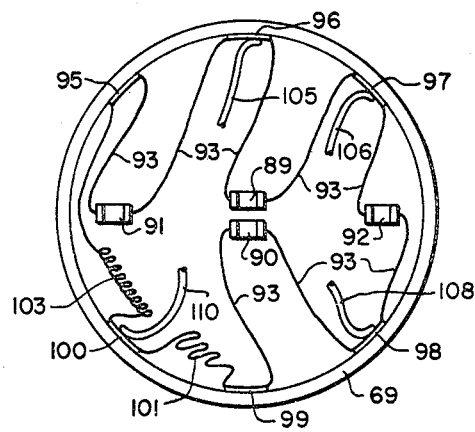
Fig. 5
Fig. 6
NELSON A. CRITES
INVENTOR
BY Gray, Mase and
Dunson, ATTORNEYS

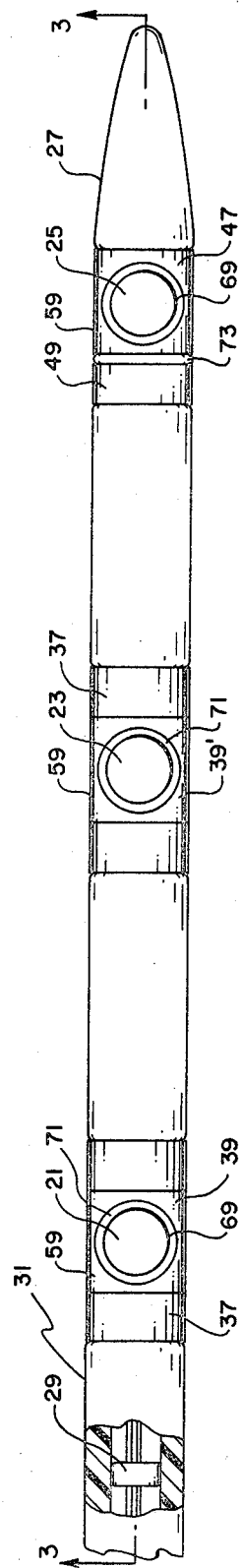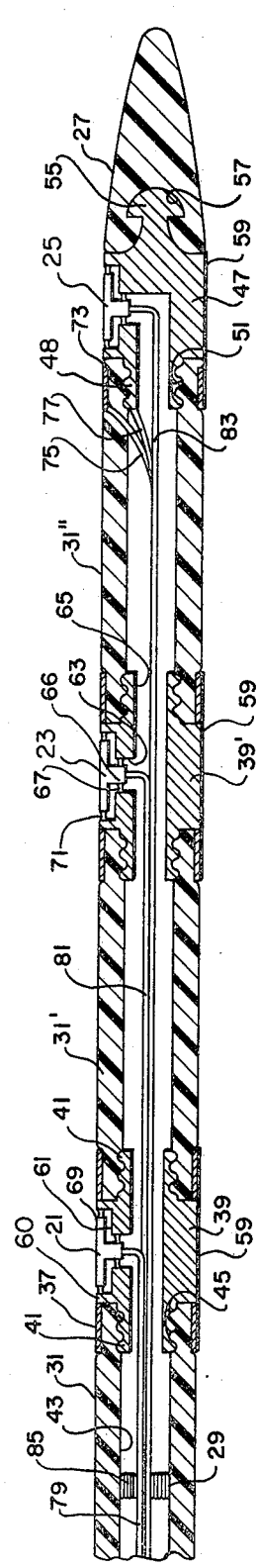

United States Patent Office 3,480,003
Patented Nov. 25, 1969

3,480,003
APPARATUS FOR MEASURING ESOPHAGEAL MOTILITY
Nelson A. Crites, Columbus, Ohio, assignor to The Battelle Development Corporation, Columbus, Ohio, a corporation of Delaware
Filed Feb. 3, 1967, Ser. No. 613,787
Int. Cl. A61b 5/10, 1/26
U.S. Cl. 128—2         4 Claims

ABSTRACT OF THE DISCLOSURE

Apparatus for measuring squeezing pressure of the esophagus, useful in detecting and diagnosing diseases and malfunctions thereof. A flexible tube having a central lumen is swallowed by the patient. Pressure sensitive transducers resiliently mounted on the tube measure variations in pressure while in or passing through the esophagus. Calibration markings indicate the length of tubing in the patient's esophagus. Other means conductivity of esophageal mucosa and pH in the esophagus or stomach.

---

Figure 1:
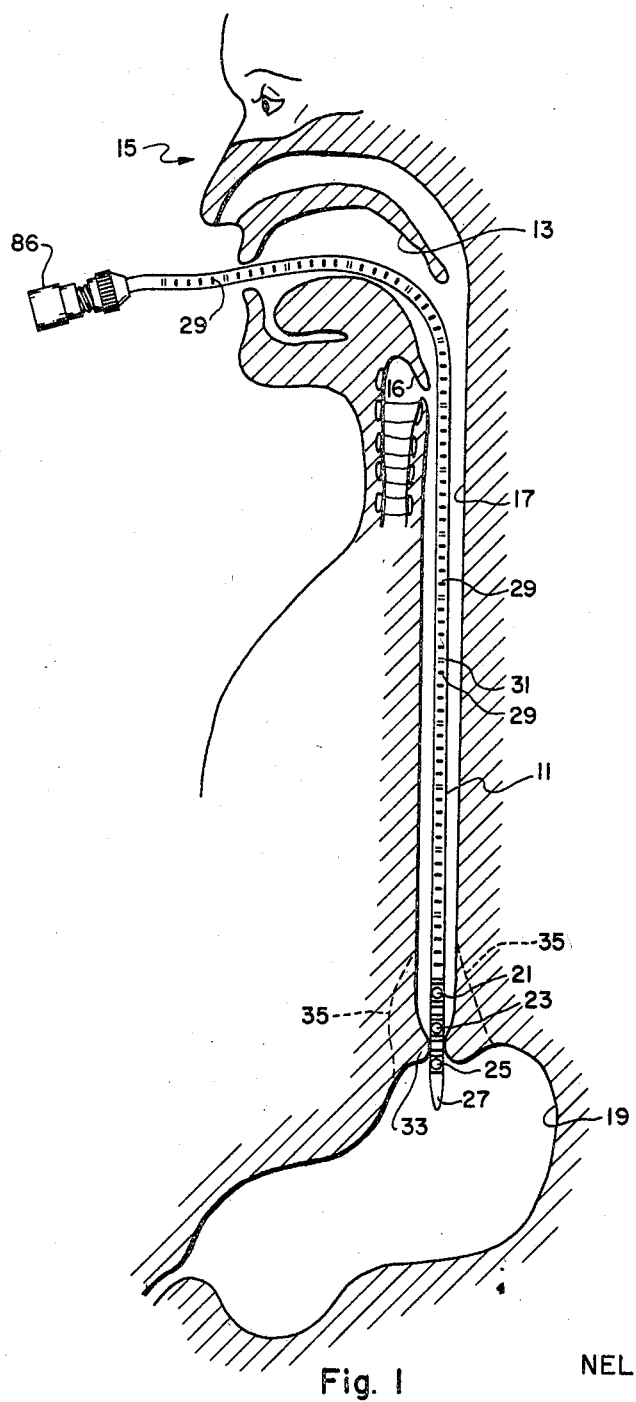

This invention relates to apparatus for measuring the squeezing pressure of the esophagus as, for example, during peristaltic movement of the musculature of the esophagus. The invention includes a flexible tube having one or more pressure-sensitive transducers mounted thereon and is insertable into the upper digestive tract.

The measurement of pressure in the esophagus is used to diagnose various ailments. Most of the present devices for measuring esophageal pressure are not sufficiently sensitive enough or accurate enough to indicate with certainty whether an actual disorder is present. Some examples of malfunctions detectable by pressure measurements in the esophagus are: fibrilation of the esophageal musculature; a diminishing peristaltic wave, hernia of the cardiac valve area (hiatus hernia), achalasia, spasms, etc. The above conditions in one way or another are detectable by pressure measurements made by the invention herein described.

One of the instruments used in the past for measuring some esophageal pressures consisted of a small balloon attached to a tube that was swallowed by the patient. The balloon was inflated with air or water and contractions of the esophagus squeezed the balloon and transmitted a pressure wave up the tube to a transducer positioned in the tube outside the patient's mouth. Inaccuracies arose due to the attenuation of the pressure wave as it passed through the tube. The balloon had a residual stretch factor that gave additional inaccuracies. The balloon also caused retching and extreme discomfort to the patient.

Another attempt to measure esophageal pressure consisted of using three tubes or catheters bound together in a bundle which the patient swallowed. The second tube was shorter than the first tube and the third tube was shorter than the second so that the open ends of the tube normally were positioned at three different levels in the esophagus in an attempt to get pressure readings at three different points. A pressure transducer was positioned outside the mouth in each tube to measure pressure changes at the open end of the tube. This arrangement also suffered from attenuation of the pressure wave and there was some uncertainty as to the significance of the measurements since it appeared that variations in pressure were largely due to changes in hydrostatic pressure rather than squeezing pressure. Mucus also entered and clogged the tubes thereby eliminating any reading on the clogged tube. The additional feature of passing a constant flow of fluid, such as saline, through the tubes did not eliminate some of the earlier problems and added the uncertainty as to whether the flowing fluids might stimulate, relax, or have other effects on the esophagel musculature and mucosa.

Briefly described, this invention includes a flexible tube or probe for entering the esophagus and at least one pressure-sensitive transducer mounted on the tube to obtain more direct readings on the squeezing pressure of the esophagus. The transducer or transducers are resiliently mounted thereby eliminating false readings due to bending of the tube or strain on the transducer holders. Means are also included for measuring the conductivity of the mucosa, actual entry length of the tube, and, where desired, means for measuring the acidity of the tube environment. The transducers are miniaturized, extremely sensitive, and means are provided internally for temperature compensation. The probe is connected to a suitable amplifier and oscillograph and pressure may be read directly from each transducer.

It is accordingly an object of this invention to provide apparatus that accurately measures the squeezing pressure of the esophagus, is relatively comfortable to the patient and minimizes disturbing factors to the esophagus as it is used.

Another object of this invention is to provide an instrument whose elements and accuracy are essentially undamaged and unaffected by the environment of the upper digestive tract.

Another object of the invention is to provide a device having a degree of sensitivity sufficient to detect the slightest constriction, pressure change or enlargement in the esophagus.

Other objects and advantages of the invention will be apparent from the description that follows, the drawings, and the claims.

In the drawings:
FIG. 1 is a diagram showing the probe in esophagus of a patient;
FIG. 2 is an enlarged view of the end of the probe and the pressure transducers;
FIG. 3 is a sectional view of the end of the probe taken along the line 3—3 of FIG. 2;
FIG. 4 is a perspective view of the diaphragm for the transducer and the preferred arrangement of the semi-conductors.
FIG. 5 is a plan view of the diaphragm and side walls of the transducer showing the electrical connections; and
FIG. 6 is a diagram showing the method for calibrating the transducer.

Referring to FIG. 1, the probe 11 is inserted into the oral cavity 13 of the patient 15. The patient 15 is instructed to swallow and the probe 11 passes the epiglottis and moves into the esophagus 7. On continued swallowing the probe 11 moves down the esophagus 17 until it enters the stomach 19. The transducers 21, 23, and 25 (there may be fewer or more transducers, but the preferred number is three) are equally spaced from each other along the length of the probe starting from the tapered tip 27. The actual length of the probe 11 that is positioned inside the patient 15 is determined by a series of calibration markings 29—29. The calibration markings 29—29 (shown also in FIG. 3) are comprised of colored plastic tape that is visible through the translucent flexible tube 31. The markings 29—29 are spaced a selected distance apart and preferably the color on every fifth calibration is different from the preceding four. A sphincter muscle, commonly referred to as the cardiac valve 33 and positioned between the esophagus 17 and stomach 19 is helpful in determining the positional relationship of the probe 11 with respect to the end of the esophagus 17. The pressure readings on each transducer 21, 23, and 25 normally diminish as soon as it passes the cardiac valve 33 and enters the stomach 19. As the probe 11 is slowly withdrawn, each transducer 21, 23, and 25 passes through the cardiac valve 33 and, assuming the cardiac valve 33 is normal, there is an abrupt and large increase in the pressure reading. If a condition such as hiatus hernia exists (as represented by the broken lines 35—35), the change in pressure reading is neither as great nor as abrupt.

FIGS. 2 and 3 show the mounting construction and preferred relationship of the transducers 21, 23, and 25 on the tube 31. A cylindrical sleeve or bonding ring 37 is slipped over the outside of the tube 31. A transducer holder 39 having each end 41—41 constructed slightly larger than the tube lumen 43 has one end 41 inserted into the lumen 43. Each end portion 41 has a plurality of grooves 45—45 to aid in retaining the holder 39 in the tube 31. After the end 41 has been forced into the lumen 43, the banding ring 37 is slid back toward the holder 39 forcing the resilient material of the tube 31 into the groove 45. If preferred, the end 41 may be coated with a suitable adhesive before it is inserted into the lumen 43. A second segment of tubing 31' a second transducer holder 39' and a third segment of tubing 31" are connected in the same manner as transducer holder 39 and tube 31. A third transducer holder 47 having a slightly longer end portion 48 with grooves 51—51 is inserted into tubing segment 31" with a banding ring 49 positioned around the outside. The opposite end of the holder 47 is provided with a knob 55 that fits into a receptacle 57 on the tapered tip 27 and held more securely in place by adhesive if desired.

Each transducer holder 39, 39', and 47 is provided with an enlarged cylindrical central portion 59 that has an outside diameter substantially equal to the outside diameter of tube 31 and tube segments 31' and 31". A cup 61 is formed in the outer surface of central portion 59 with a hole 63 communicating into the central lumen 65 of each holder 39, 39', and 51. The stem 66 of each transducer (21, 23, and 25) fits into the hole 63 with some clearance and is cemented in place with a relatively resilient cement 67, for example, silicone rubber cement. The rim 69 of each transducer (21, 23, and 25) is attached to a resilient annular ring 71 which is also attached to the inner edge 60 of the cup 61. The transducers 21, 23, and 25 are thus resiliently mounted so that any distortion of the holders 39, 39', or 47 does not stress the transducers (21, 23, and 25) producing erroneous readings. The bonding ring 49 is positioned a small distance from central portion 59 of holder 47 leaving a small segment 73 of tubing segment 31" as an insulator between bonding ring 49 and holder 47. A conductor 75 is connected to bonding ring 49 and a conductor 77 is connected to holder 47. The conductivity of the esophageal mucosa may be tested across the small insulating segment 73. Conductor 77 also serves as a "stop" by being made of a heavier gage material so that any tendency to stretch the probe 11 is prevented by conductor 77. The conductors to the transducer 21, 23 and 25 are positioned inside woven shieldings 79, 81, and 83, respectively. The woven shieldings 79, 81, and 83 are provided to shield out magnetic influences between the circuits of the transducers. The various conducting elements (75, 77, 79, 81, and 83) are grouped in a bundle 79 along the central axis of the lumen 43 and held in a centralized position by a centering holder 85 which also serves as the calibration markings 29—29 discussed previously. The preferred material for the centering holder 85 is a florescent plastic tape that produces the distinctive calibration markings 29—29 visible through the translucent tube 31. All the conducting elements (75, 77, 79, 81, and 83) are brought to a connector 86 at the end of the tube 31.

FIG. 4 shows a transducer diaphragm 87 and the position of the semiconductors 89, 90, 91, and 92. Two semiconductors 89 and 90 are positioned in the central area of the diaphragm that is under radial tension upon flexing and the other two semiconductors 91 and 92 are positioned in the outer portion of the diaphragm that is under radial compression on flexing.

FIG. 5 is a view of the inner surface of the diaphragm 87 and the rim 69. Cross conductors 93—93 are connected between the ends of the semiconductors 89-92 and contact plates 95-99 to form a Wheatstone bridge arrangement. Contact plate 100 is introduced in order to add a zero correction resistor 101 and a temperature correction resistor 103. Four conductors 105, 106, 108, and 110 are connected to contact plates 96, 97, 98, and 100, respectively, and brought out through the stem 66 of the transducer (21, 23, or 25) and into a woven shielding (79, 81, or 83).

The transducers (21, 23, and 25) are first assembled with ordinary conductors between contacts 95 and 100 and contacts 99 and 100. A voltage is applied to the bridge and the transducer is zero corrected by adding a proper amount of resistance wire between contacts 99 and 100 and the transducers are also subjected to controlled temperature variations to determine the amount of resistance 103 (a resistance that varies linearly with temperature) that is to be placed between contacts 95 and 100. After zero correction, temperature correction, and assembly, the transducers are calibrated so that the electrical readings can be read directly as pressure. FIG. 6 shows one method of calibrating the transducers 21, 23, and 25. The probe 11 is inserted through a split cork 104 and fitted into a flask 105. The pressure in the flask 105 is increased by suitable means (such as the cylinder-piston device 107) through the passage 109 and measured by the manometer 111. Each transducer (21, 23, and 25) gives a substantially linear response, however, the slope of each curve may differ slightly. Once each transducer (21, 23, and 25) has been calibrated the final curves can be made to coincide by adjustments in the amplifier for the oscillograph. Thus, the operator can read the pressures direct from the oscillograph.

The probe 11 is sensitive enough to detect heart beats while in the esophagus. Three transducers are preferred since a diminishing peristaltic wave is more easily detected. Also, a longer length of the esophagus is subjected to measurement at one time so that the extent of a defect is ascertainable without moving the probe in and out of the esophagus.

What is claimed is:

1. Apparatus for providing electrical signals responsive to the pressure in the esophagus comprising:
    (a) a translucent flexible tube small enough in outside diameter to be inserted in the esophagus, said flexible tube being divided into a plurality of segments and having a central lumen that is open at one end and closed at the other;
    (b) a transducer holder positioned between the adjacent ends of successive said segments, and at the closed end, of said flexible tube, each said transducer holder having a central portion of substantially the same outside diameter as said flexible tube and smaller end portions inserted into the central lumen of said flexible tube, each said central portion having a cup in the outer surface, said segments being connected together by said transducer holders said closed end being tapered for insertion into the esophagus; and
    (c) a pressure transducer comprising a diaphragm resiliently mounted in each said cup with the face of said diaphragm substantially flush with the outer surface of said tube and having strain sensitive elements mounted on the surface thereof opposite said face, and electrical conductors connected to said elements and passing through the central lumen of said flexible tube to said open end for connection to appropriate indicating instrumentation.

2. Apparatus according to claim 1, wherein said conductors are held centrally positioned in said lumen by regularly spaced holders that are visible through said flexible tube and also serve as calibration markings.

3. Apparatus according to claim 1, wherein a wire is anchored to the transducer holder at said closed end to prevent said flexible tube from stretching lengthwise.

4. Apparatus according to claim 1, wherein said transducer holder is constructed from electrical conducting material so that said central portion is an electrical conductor at the outer surface of said flexible tube, and said apparatus having, closely spaced from one said central portion on the exterior of said flexible tube, another electrical conductor, whereby a small voltage may be conected to said conductors for measuring the electrical conductivity of the esophogeal mucosa therebetween.

References Cited

UNITED STATES PATENTS

| | | | |
|---|---|---|---|
| 1,060,665 | 5/1913 | Bell | 128—349 |
| 1,518,211 | 12/1924 | Maue | 128—2 |
| 2,634,721 | 4/1953 | Greenwood | 128—2.05 |
| 2,931,225 | 4/1960 | Pleuger | 73—398 XR |
| 2,976,865 | 3/1961 | Shipley | 128—2.05 |
| 2,981,911 | 4/1961 | Warnick | 73—398 XR |
| 3,196,375 | 7/1965 | Jones | 128—2.05 XR |
| 3,219,035 | 11/1965 | Pressman et al. | 73—398 XR |
| 3,242,449 | 3/1966 | Stedman | 73—398 XR |
| 3,325,761 | 6/1967 | McLellan | 73—398 XR |

RICHARD A. GAUDET, Primary Examiner

KYLE L. HOWELL, Assistant Examiner

U.S. Cl. X.R.

73—88.5, 398; 128—2.1

PO-1050
(5/69)

UNITED STATES PATENT OFFICE
CERTIFICATE OF CORRECTION

Patent No. 3,480,003  Dated November 25, 1969

Inventor(s) Nelson A. Crites

It is certified that error appears in the above-identified patent and that said Letters Patent are hereby corrected as shown below:

Column 1, line 20, between "means" and "conductivity" insert --measure--.

Column 2, line 51, "7" should read --17--.

SIGNED AND
SEALED
MAY 5 1970

(SEAL)
Attest:

Edward M. Fletcher, Jr.
Attesting Officer

WILLIAM E. SCHUYLER, JR.
Commissioner of Patents